(12) United States Patent
Dombroski et al.

(10) Patent No.: US 8,751,338 B2
(45) Date of Patent: Jun. 10, 2014

(54) SYSTEM AND METHOD OF INTRA-CYCLE PAYMENT OF ACCRUED EMPLOYEE WAGES

(76) Inventors: Frank P. Dombroski, Westfield, NJ (US); John Lockhart, Cave Creek, AZ (US)

( * ) Notice: Subject to any disclaimer, the term of this patent is extended or adjusted under 35 U.S.C. 154(b) by 0 days.

(21) Appl. No.: 12/897,816

(22) Filed: Oct. 5, 2010

(65) Prior Publication Data

US 2011/0082778 A1    Apr. 7, 2011

Related U.S. Application Data

(60) Provisional application No. 61/248,624, filed on Oct. 5, 2009.

(51) Int. Cl.
| | |
|---|---|
| *G07C 1/10* | (2006.01) |
| *G07F 19/00* | (2006.01) |
| *G06Q 40/02* | (2012.01) |
| *G06Q 40/00* | (2012.01) |

(52) U.S. Cl.
CPC .............. *G06Q 40/02* (2013.01); *G06Q 40/125* (2013.12)
USPC ............................................... 705/32; 705/30

(58) Field of Classification Search
None
See application file for complete search history.

(56) References Cited

U.S. PATENT DOCUMENTS

| | | | | |
|---|---|---|---|---|
| 2001/0034676 | A1* | 10/2001 | Vasic | 705/30 |
| 2002/0184148 | A1* | 12/2002 | Kahn et al. | 705/40 |
| 2003/0065618 | A1* | 4/2003 | VanDeBoe, Jr. | 705/40 |
| 2007/0156577 | A1* | 7/2007 | Lanham et al. | 705/38 |
| 2008/0270304 | A1* | 10/2008 | Brown | 705/44 |
| 2009/0127328 | A1* | 5/2009 | Aissa | 235/377 |
| 2009/0192926 | A1* | 7/2009 | Tarapata | 705/32 |

* cited by examiner

*Primary Examiner* — Mussa A Shaawat
(74) *Attorney, Agent, or Firm* — The McHattie Law Firm

(57) ABSTRACT

Described herein are systems, methods and computer program product of integrated payroll solutions enabling low cost on-demand intra-cycle payment of accrued employee wages, to meet critical cash flow needs.

23 Claims, 4 Drawing Sheets

WageBank Process Flow

SYSTEM AND METHOD OF INTRA-CYCLE PAYMENT OF ACCRUED EMPLOYEE WAGES

CROSS-REFERENCE TO RELATED APPLICATION

This application claims benefit of and priority to U.S. Provisional Patent Application Ser. No. 61/248,624, filed Oct. 5, 2009, which is fully incorporated by reference herein and made a part hereof.

BACKGROUND

Following the financial collapse of 2008 precipitated by the banking system's widespread failure and subsequent consumer credit crisis, employee demand for intra-cycle payroll payment or advance of earned wages increased exponentially.

The majority of 40,000,000 unbanked households (106 million people) in the United States do not have access to short term credit other than payday loans. The high cost of payday loans creates a tough-to-break cycle creating the need for more payday loans. The average cost of these loans is a significant percentage (15%+) of the average take-home pay for this group. The impact of this expense on this group can severely limit their ability to afford the necessities of their job (transportation) and basic needs such as food & housing.

Furthermore, payday loans may not provide instant access to cash as the borrower may have to wait for banks or check-cashing services to open or wait for checks to clear. Also, when cashed the borrower may be at risk of theft or loss of the cash.

Therefore, what is needed are systems, methods and computer program product to provide means for intra-cycle payment of accrued employee wages and/or advances on unearned wages that overcome challenges in the art, some of which are described above.

SUMMARY

Described herein are systems, methods and computer program product of integrated payroll solutions enabling low cost on-demand, intra-cycle payment of accrued employee wages, and employer controlled unearned wage advances to meet critical cash flow needs.

Additional advantages will be set forth in part in the description which follows or may be learned by practice. The advantages will be realized and attained by means of the elements and combinations particularly pointed out in the appended inventive concepts. It is to be understood that both the foregoing general description and the following detailed description are exemplary and explanatory only and are not restrictive, as inventive concepts.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
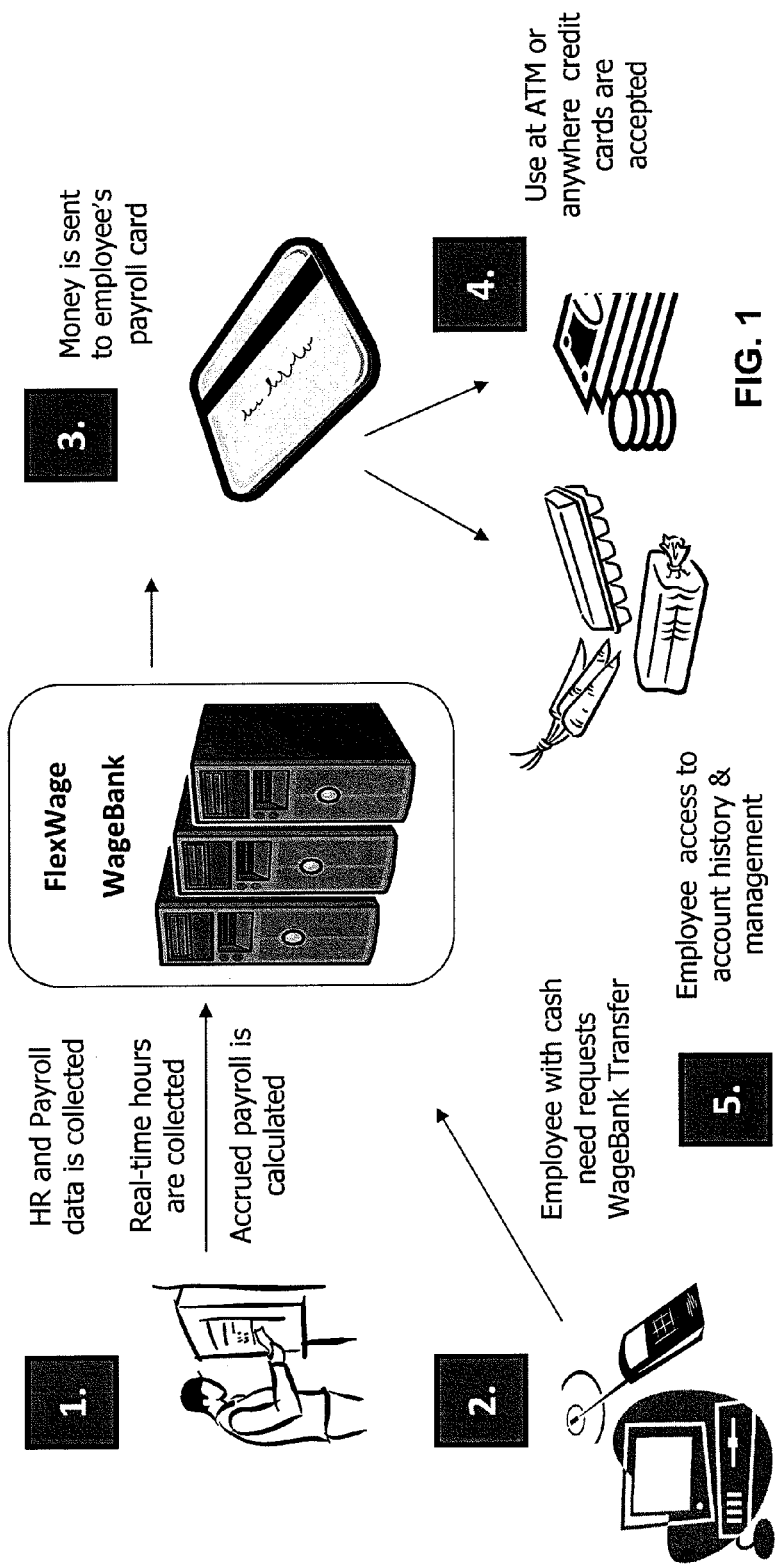
FIG. 1 illustrates one embodiment of a system that can be used to practice aspects of the invention.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended inventive concepts, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and inventive concepts of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Basic Operation:

Embodiments of the invention comprise an "on-demand payroll" service offering users an array of financial tools enabling them to conduct a variety of financial transactions with great efficiency and cost savings. Company employees who are enrolled in the system have the ability to access all or a portion of their earned income using embodiments of the system before the end of a payroll cycle. Access to earned income and credit is permitted according to business rules established by the employer and input to embodiments of the system. Once an employee has requested funds, the earned wages (generally, net of taxes and other deductions), and or a credit in the form of an advance against future earnings are loaded onto a vehicle such as for example a smart card or an integrated debit card. In one aspect, the card is in every way a traditional debit card and can be used anywhere that debit card transactions are accepted. Funds may also be transmitted directly to a traditional bank (DDA) account.

Embodiments of the system offer advantages to an employer by keeping the payroll process straightforward and simple. It may also enable the employer to extend advanced payment against future earnings and to control the amount of advance an employee is privileged to receive based on employment performance, tenure and other "common sense" criteria (i.e. good employee=low risk=advance worthy, a new or marginal employee=more risk=less advance worthy). Thus the employer is empowered to extend advances as they see prudent. Embodiments offer advantages to the employee, too, by providing a straightforward and viable alternative to a traditional bank account without subjecting the employee to the high fees of a check cashing business or the extraordinary and often usury fees charged by "payday lenders" and "fast cash" lenders (personal loans against car titles, etc.).

FIG. 1 illustrates one embodiment of a system that can be used to practice aspects of the invention. The attached diagram illustrates an embodiment comprising a web- and telephonically enabled Interactive Voice Response System (IVR), as are known to one of ordinary skill in the art, and the interaction with various technology components of an embodiment of a total system. In a first step (not shown in FIG. 1) a company, entity, organization or individual (referred to hereinafter as "company") desiring to utilize the systems and methods described herein undergo a set-up procedure comprising company enrollment and configuration of policy and procedures, entitlements and privileges and mass employee enrollment. At step 1 of FIG. 1, real-time hours and wages are either electronically or manually recorded and synchronized between an embodiment of the system and employee/employer Payroll/HRMS systems. Other information that can be obtained from the Payroll/HRMS systems includes taxes and other deductions that can be used to calculate available earned income, which are wages earned net of taxes and other deductions. Step 2 comprises applicant registration. In various aspects, a user can access and manage an account through various platforms including for example registering and accessing an embodiment of the system through computer, telephone (IVR) PDA, etc. When accessing the system, a user can undergo Customer Identification Processing that may include for example anti-money laundering (AML) and know your customer (KYC/CIP) compliance. Once accessed, in one aspect a user can configure personal preferences. At step 3, funds are loaded onto an employee's payroll card, general purpose prepaid card, smart card or transmitted to their DDA. At step 4, employee uses the card to withdraw funds at ATMs or as a payment vehicle anywhere credit and/or debit or smart cards are accepted or accesses funds through their bank account. At step 5, employee accesses the system to track card transaction history, pay bills online, and conduct account maintenance.

Embodiments of the described invention provide a unique system and process enabling on-demand, intra-cycle payment of accrued employee wages, and/or advances against future wages to meet critical cash flow needs. Generally, an employer (e.g., a company) provides initial set up, configuration and employee enrollment. This includes, for example, providing identifying information about employees, their pay cycles and pay rate, information about the employer, etc. This information is generally available from an employer's human resource management system (HRMS) and/or payroll system. Generally, this information is confidential and can be hand keyed, encrypted or otherwise securely transmitted into the system using security means such as, for example, SSL, as is known to one of ordinary skill in the art. An applicant (e.g., an employee) registers with the system via for example web portal, phone (IVR), etc., and submits detailed employee (user) information and employment information (i.e., application data). Once received, application data is processed by an engine residing in a server. It is to be appreciated that the server can be a single server or a combination of multiple servers either residing in a single location or widely dispersed. The application data is reconciled against and compared to the employer's HRMS and/or payroll systems data in addition to reconciled against regulatory requirements A pass/fail decision is made, similar to an automated underwriting process, whether to accept or reject the applicant/enrollee.

If the decision is to reject or decline, the applicant and employer can be notified of the reason(s) for rejection. In one aspect, the reason for rejection can be provided in writing (e.g., an email, letter, etc.) Appeal procedures can be listed and explained with the rejection. If the application is accepted, the employee's data is transmitted and synchronized with the respective employer's payroll or HRMS system to facilitate payment and tracking of wage balances. Conversely, in one aspect the employer can have administrative access to the system and can manually enroll employees (applicants) ad hoc via this administrative system access. Once accepted, an applicant receives credential and activation instructions and activates his or her account as one would activate a credit card or debit card. Once completed, the employee is matriculated into the system, and is able to use the system. At time of use, the employee presents credentials upon log-in (web portal or IVR).

In one embodiment, the card can be used as a debit/credit card and the user has access to accrued wages from his or her employer and an employer controlled/determined advance line. The user can request the employer set aside the funds for the employee's use (automatically), or the user may have access to transfer funds to the debit/credit card account. In another embodiment, the card serves as a credit card with an established limit. For example, the credit limit may be set above, at or below the user's monthly available earned income. In another embodiment, the card is a smart card or prepaid card that has a limited amount of funds on the card itself corresponding to the user's available earned income. In one aspect, the card may be re-loaded, while in another aspect the card is disposable once the funds are used. In yet another embodiment, the system can be integrated with a user's bank account such that accrued available earned income can be transferred to a user's existing bank account.

Figure 2:
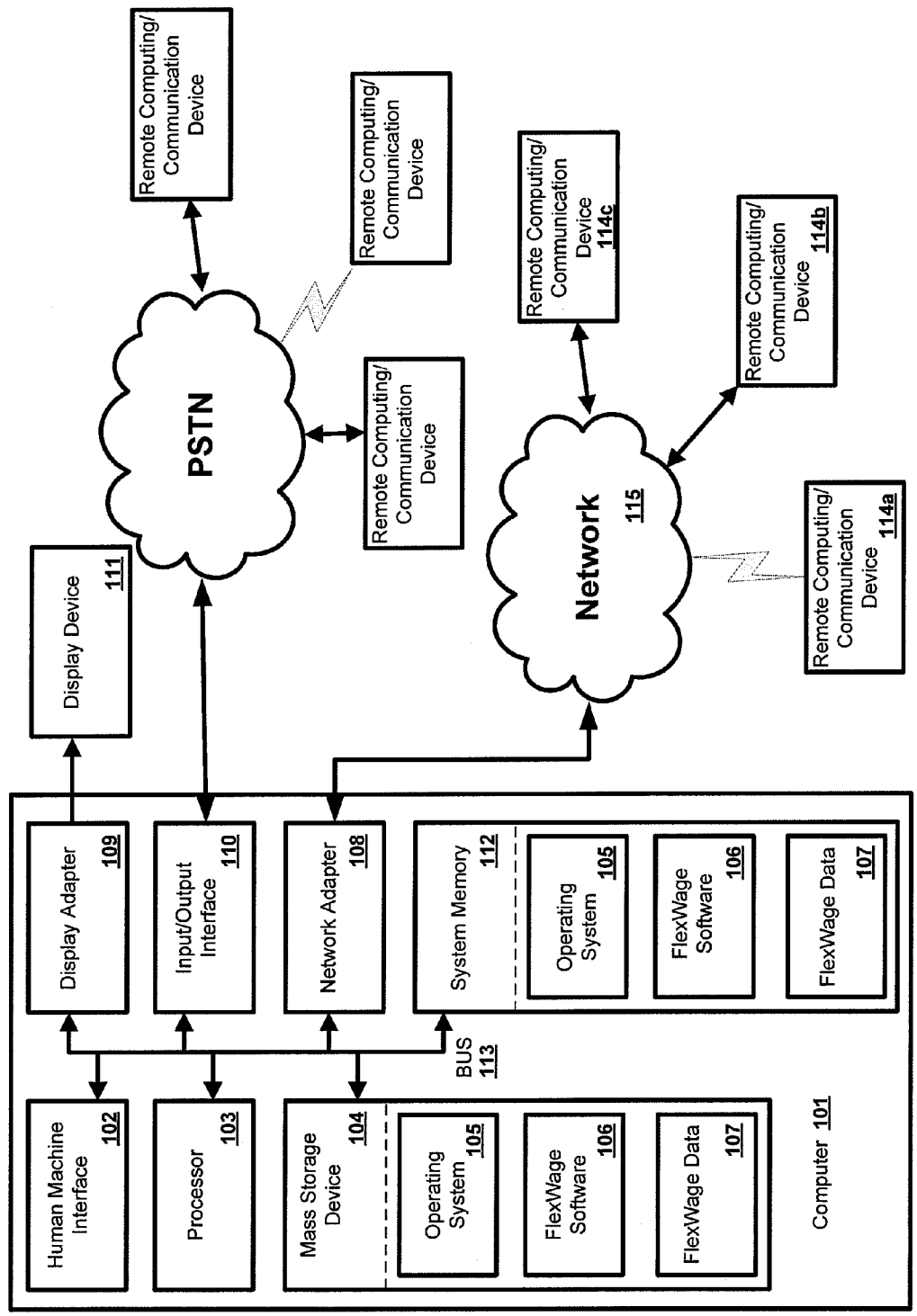
FIG. 2 is a block diagram illustrating an exemplary operating environment for performing the disclosed methods.

As described herein, embodiments provide a means to eliminate the traditional lag between work performed, and payment to the employee, without impacting payroll periodic accounting. The service is targeted at lower paid, hourly workers that often turn to payday loans or fast cash loans to bridge their cash flow challenges and can significantly decrease their cost of access to short term cash flow, and (as compared to utilizing a payroll loan) provide an effective 10% to 25% increase in net take home pay. Embodiments of the systems described herein record employee hours and calculate the value of labor that is accrued, but not yet paid. In real time, employees will be able to elect to take payment for income they have earned. As payment elections are made, the system will "load" the network processing system, and make these funds available as an interim payroll or advance for registered users. Users may access their funds at ATMs, or by utilizing their cards such as debit or credit cards that can generally be used at any merchant that accepts debit or credit cards. Users may also utilize the system to facilitate electronic bill payment functions, track transaction history, and perform general card maintenance described as but not limited to ordering an additional card, reporting card lost or stolen and disputing transactions The system has been described above as comprised of units. One skilled in the art will appreciate that this is a functional description and that the respective functions can be performed by software, hardware, or a combination of software and hardware. A unit can be software, hardware, or a combination of software and hardware. The units can comprise the FlexWage Software 106 as illustrated in FIG. 2 and described below. In one exemplary aspect, the units can comprise a computer 101 as illustrated in FIG. 2 and described below.

FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, FlexWage software 106, FlexWage data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as FlexWage data 107 and/or program modules such as operating system 105 and Bridge software 106 that are immediately accessible to and/or are presently operated on by the processing unit 103.

In another aspect, the computer 101 can also comprise other removable/non-removable, volatile/non-volatile computer storage media. By way of example, FIG. 2 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and FlexWage software 106. Each of the operating system 105 and FlexWage software 106 (or some combination thereof) can comprise elements of the programming and the FlexWage software 106. FlexWage data 107 can also be stored on the mass storage device 104. FlexWage data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing/communication devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115. In this means, the computer 101 can network with company payroll and HRMS systems, banking systems, and credit/debit card systems.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of FlexWage software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

EXAMPLES

The following examples are put forth so as to provide those of ordinary skill in the art with a complete disclosure and description of how the compounds, compositions, articles, devices and/or methods described herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for.

An example will serve to explain in more detail how these steps operate.

Figure 3:
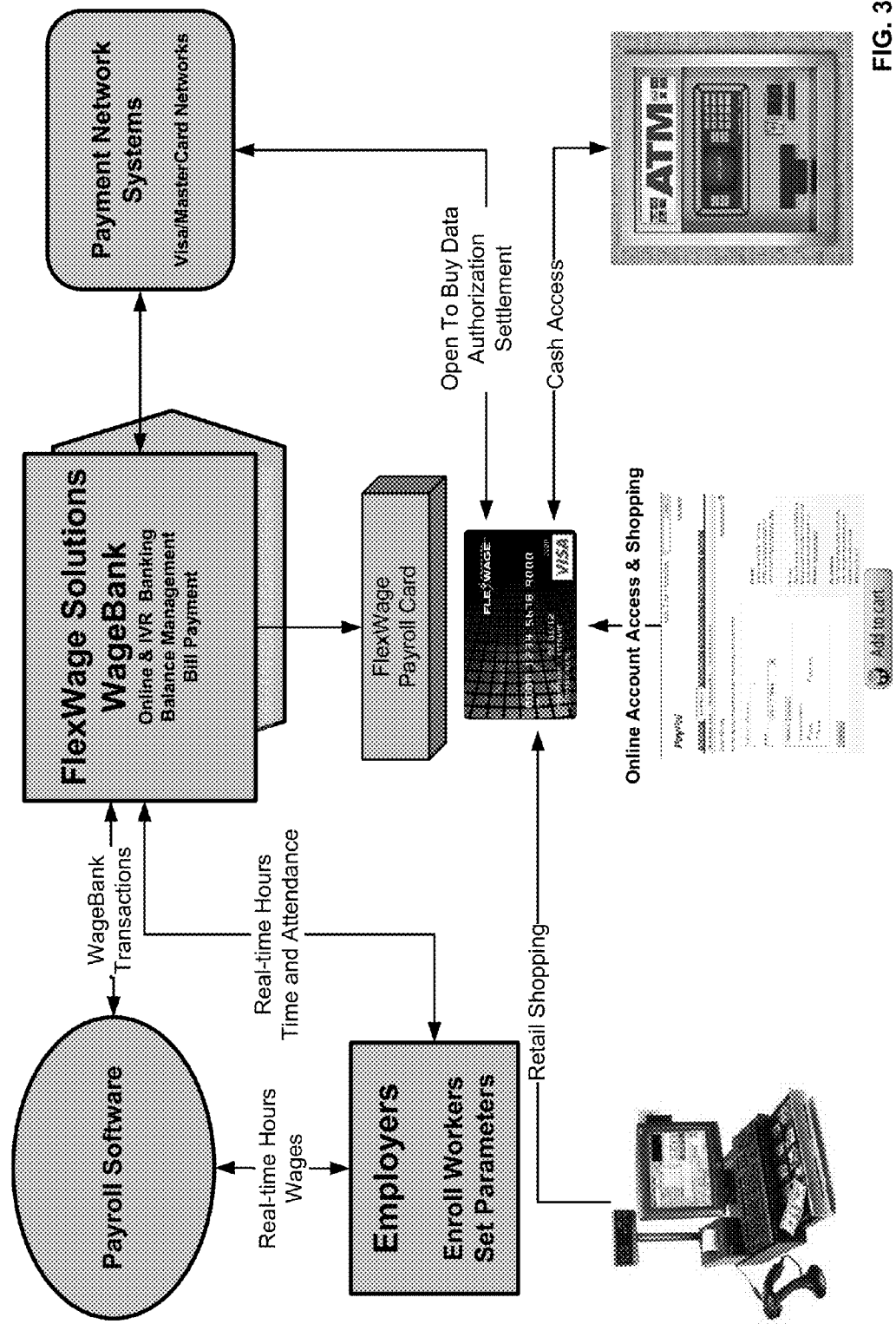
FIG. 3 illustrates an exemplary process flow diagram where the use of the shown system is integrated with credit card and banking (ATM) systems.
Figure 4:
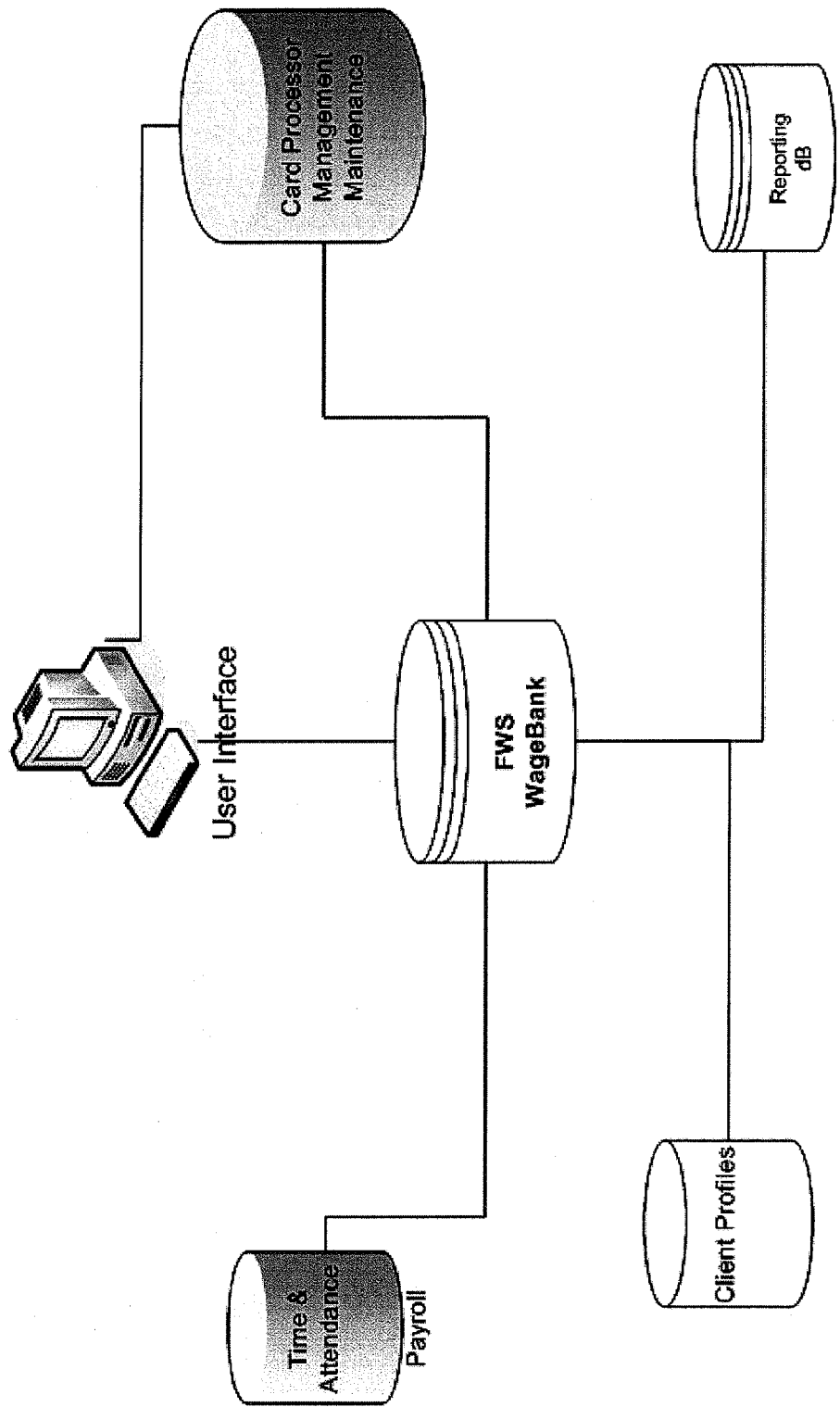
FIG. 4 illustrates an exemplary data flow diagram corresponding to the exemplary process flow diagram of FIG. 3.

FIG. 3 illustrates an exemplary process flow diagram where the use of the shown system is integrated with credit card and banking (ATM) systems. In one aspect, payroll system software can be provided or the system can interface with existing payroll programs. Interim payroll policies and rules are established between the system and an employer. The employer enrolls employees in the program. All employees can be enrolled or only those opting into the program. In one aspect, all or part of an enrolled employee's payroll is loaded to a card or an account associated with a card each pay period. The system can receive a daily file containing time and attendance data from employers. The system calculates and logs available earned income. As needs arise, employees can draw against available earned income they have earned but not been paid or request an instant credit advance on future earned wages. In one aspect, employees can use their card at ATMs or to transact anywhere debit or credit cards are accepted. In another aspect, employees may also utilize the system to facilitate electronic bill payment functions, manage balances, track transaction history, and perform general card maintenance described as but not limited to ordering an additional card, reporting card lost or stolen and dispute transactions FIG. 4 illustrates an exemplary data flow diagram corresponding to the exemplary process flow diagram of FIG. 3.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method inventive concept does not actually recite an order to be followed by its steps or it is not otherwise specifically stated in the inventive concepts or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following inventive concepts.

What is claimed is:

1. A system for providing instantaneous knowledge regarding and access to an on-demand, intra-cycle payment of accrued employee wages without impacting payroll periodic accounting and employer control of cash flow, the system comprising:
    (a) a storage device for storing at least payroll data for an at least one employee of an employer, wherein the payroll data associated with each of the at least one of the employees are accrued based on at least one of hours worked or a predetermined business rule in real time; and
    (b) a processor for performing the steps of:
        (i) receiving employee information based on at least one of hours worked or a predetermined business rule for a selected employee of the at least one employees in real time;
        (ii) proactively and continuously calculating and making available for display accrued earned income for the selected employee based at least on the received real-time employee information in real time;
        (iii) synchronizing said real time calculated accrued earned income with the employer's method of payroll in said real time;
        (iv) instantaneously providing access to said real time calculated accrued earned income synchronized with the said employer's method of payroll in said real time to said selected employee;
        (v) in response to receiving a request from said selected employee for receipt of all or a portion of the accrued earned income at the time of the request between periodic paydays associated with the selected employee, determining if the request is accepted or denied based at least on a predetermined business rule established by the employer by evaluating the predetermined business rule and the synchronized real time payroll information; and
        (vi) in response to the request being accepted, instantaneously transferring the requested all or a portion of the accrued earned income from an account associated with the employer pursuant to a predetermined business rule to an account associated with and controlled by the selected employee in said real time.

2. The system of claim 1, wherein the processor performs the additional step of providing reporting to both the employer and the selected employee.

3. The system of claim 1, wherein the account associated with the employer is a bank account.

4. The system of claim 1, wherein the account associated with the employee is a prepaid payroll debit card.

5. The system of claim 1, wherein the account associated with the employee is a prepaid general purpose prepaid debit card.

6. The system of claim 1, wherein the account associated with the employee is a prepaid smart card.

7. The system of claim 1, wherein the storage device comprises a human resource management system.

8. The system of claim 1, wherein the storage device comprises a payroll processing vendor.

9. The system of claim 1, wherein the processor receives the request from the selected employee through an interactive voice response system.

10. The system of claim 1, wherein the processor receives the request from the selected employee through a web site.

11. The system of claim 1, wherein the processor transfers the accrued earned income to the account associated with the payroll card as a cash advance.

12. A method for providing instantaneous knowledge regarding and access to an on-demand, intra-cycle payment of accrued employee wages without impacting payroll periodic accounting and employer control of cash flow, the method comprising the steps of:
    (a) storing, in a storage device, at least payroll data for an at least one employees of an employer, wherein the payroll data associated with each of the at least one of the employees are accrued based on at least one of hours worked or a predetermined business rule in real time;

(b) receiving, at a computing device, employee information based on at least one of hours worked or a predetermined business rule for a selected employee of the at least one employees in real time;

(c) proactively and continuously calculating and making available for display at the computing device, accrued earned income for the selected employee based at least on the received real-time employee information in real time;

(d) synchronizing said real time calculated accrued earned income with the employer's method of payroll in said real time;

(e) instantaneously providing access to said real time calculated accrued earned income synchronized with the said employer's method of payroll in said real time to said selected employee;

(f) in response to receiving, at the computing device, a request from said selected employee for receipt of all or a portion of the accrued earned income at the time of the request between periodic paydays associated with the selected employee, determining, at the computing device, if the request is accepted or denied based at least on a predetermined business rule established by the employer by evaluating the predetermined business rule and the synchronized real time payroll information; and (g) in response to the request being accepted, instantaneously transferring by the computing device the requested all or a portion of the accrued earned income from an account associated with the employer pursuant to a predetermined business rule to an account associated with and controlled by the selected employee in said real time.

13. The method of claim 12, further comprising reporting, by the computing device, to both the employer and the selected employee.

14. The method of claim 12, wherein the account associated with the employer is a bank account.

15. The method of claim 12, wherein the payroll card comprises a prepaid payroll debit card.

16. The method of claim 12, wherein the account associated with the employee is a prepaid general purpose debit card.

17. The method of claim 12, wherein the payroll card comprises a prepaid smart card.

18. The method of claim 12, wherein the storage device comprises a human resource management system.

19. The method of claim 12, wherein the storage device comprises a payroll processing vendor.

20. The method of claim 12, wherein the computing device receives the request from the selected employee through an interactive voice response system.

21. The method of claim 12, wherein the computing device receives the request from the selected employee through a web site.

22. The method of claim 12, wherein the computing device transfers the payroll funds to the account associated with the payroll card as a cash advance.

23. A computer-readable non-transitory storage medium having stored thereon computer-executable instructions for use in providing instantaneous knowledge regarding and access to an on-demand, intra-cycle payment of accrued employee wages, the computer-executable instructions used to direct a computer to perform the steps of:

(a) storing at least payroll data for an at least one employee of an employer, wherein the payroll data associated with each of the at least one employees are accrued based on at least one of hours worked or a predetermined business rule in real time;

(b) receiving employee information based on at least one of hours worked or a predetermined business rule for a selected employee of the at least one employees in real time;

(c) proactively and continuously calculating and making available for display available earned income for the selected employee based at least on the received real-time employee information in real time;

(d) synchronizing said same real time calculated earned income with the employer's method of payroll in said same real time;

(e) instantaneously providing access to said real time calculated accrued earned income synchronized with the said employer's method of payroll in said real time to said selected employee;

(f) in response to receiving a request from said selected employee for receipt of all or a portion of the available earned income at the time of the request between periodic paydays associated with the selected employee, determining if the request is accepted or denied based at least on a predetermined business rule established by the employer by evaluating the predetermined business rule and the synchronized real time payroll information; and (g) in response to the request being accepted, instantaneously transferring the requested all or a portion of the available earned income from an account associated with the employer pursuant to a predetermined business rule to an account associated with and controlled by the selected employee in said real time.

* * * * *